Feb. 21, 1967  C. H. SKINNER  3,305,251

EXPANSION JOINT

Filed Jan. 20, 1964

INVENTOR
Clayton H. Skinner

BY John L. Shotley
ATTORNEY

3,305,251
EXPANSION JOINT

Clayton H. Skinner, Buffalo, N.Y., assignor, by mesne assignments, to Hewitt-Robins, Incorporated, Stamford, Conn., a corporation of Delaware
Filed Jan. 20, 1964, Ser. No. 338,646
6 Claims. (Cl. 285—229)

This invention relates to expansion joints of the type used in pipe lines and the like to compensate for expansion and contraction of the pipe sections connected by the joint member, and more particularly to an expansion joint having a rigid insert means for imparting strength to the joint and for simplifying the manufacture of the joint.

Expansion joints are widely used for joining sections of pipe line together to compensate for the expansion and contraction of the pipe line sections due to temperature variations, and also to absorb vibration or movement of the pipe line which might be harmful to machines or apparatus to which the piping may be connected. For example, expansion joints are useful in connecting an intake or exhaust line to the compressor in a refrigeration system to accommodate relative movement between the exhaust line and the compressor.

Conventional expansion joints include two joint sections each having a body portion of generally cylindrical shape provided with a flange on the end thereof which is connected by bolts to the flange of an adjacent pipe section. The opposite facing ends of the two joint sections are connected together by a flexible central annular arch portion. In the conventional construction of expansion joints, the end flange of each joint section is formed substantially entirely of fabric and rubber integral with the cylindrical body portion of the joint section. This involves a rather expensive method of manufacturing, requiring hand building of multiple plies of fabric into the flange formation. Also this presents some difficulties in the positioning of annular reinforcing rings commonly used in the body of such joints.

Furthermore, expansion joints constructed in accordance with prior art methods, such as the method just discussed, are frequently subject to rupture or breakdown along a line bisecting the 90° angle between the flange and the cylindrical body portion of each joint section.

Accordingly it is an object of this invention to provide an expansion joint for use in connecting adjacent pipe sections and the like which may be produced more economically than expansion joints of the prior art and which requires less hand labor than expansion joints and methods of making expansion joints of the prior art.

It is another object of the invention to provide an improved expansion joint for connecting pipe sections and the like which has greater strength than expansion joints of the prior art and eliminates rupture problems encountered in expansion joints of the prior art.

In achievement of these objectives there is provided in accordance with this invention an expansion joint including two cylindrical flanged joint sections, each respectively being adapted to have the flange thereof connected to the flange of an adjacent pipe section. The two cylindrical flanged joint sections are connected by a flexible central annular arch portion, with each of the joint sections including a rigid insert of metal, plastic, or the like therein. Each rigid insert includes an axially extending cylindrical body portion and an integral radially-extending flange. The body or carcass of each of the joint sections includes a plurality of plies of rubber or other elastomer-impregnated fabric. The ply structure engages the various surfaces of the rigid insert member. The inner and outer peripheral surfaces of the entire joint structure are encased in a rubber or elastomeric covering or sheathing.

Further objects and advantages of the invention will become apparent from the following description taken in conjunction with the accompanying drawing in which.

Figure 1:
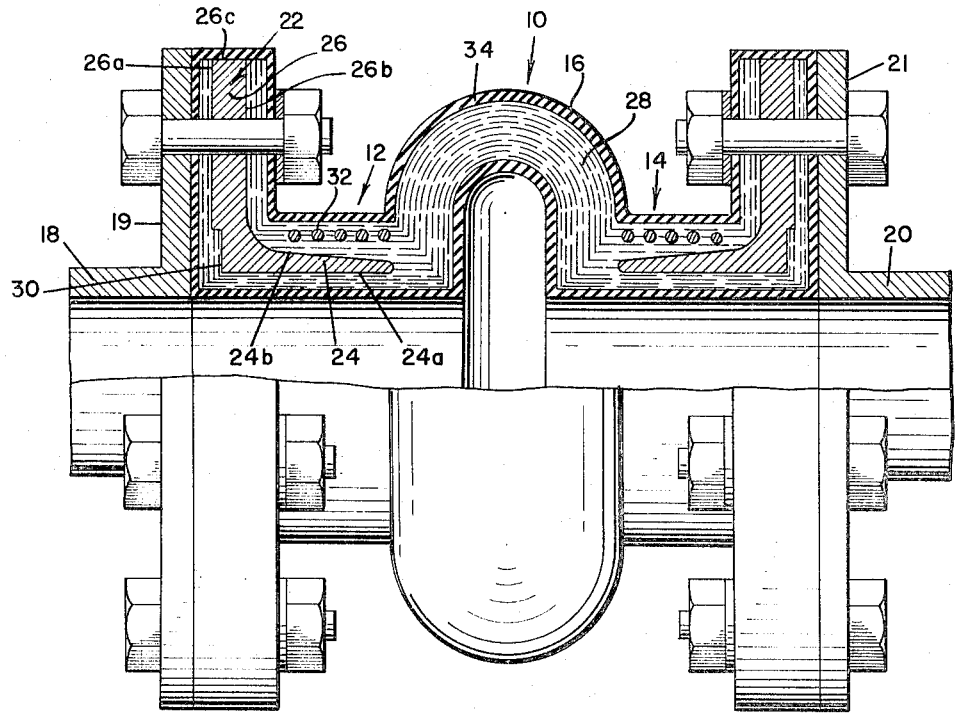
FIGURE 1 is a view in side elevation, and partially in section, of an expansion joint in accordance with the invention.

Referring now to the drawing, and more particularly to FIGURE 1, there is shown an expansion joint generally indicated at 10, including a pair of substantially identical joint sections generally indicated at 12 and 14, respectively, which are connected to each other by a flexible central annular arch 16. Joint section 12 is bolted to flange 19 of a pipe section 18, while joint section 14 is bolted to flange 21 of pipe section 20. Thus the expansion joint 10 provides a flexible joint between the two pipe sections 18 and 20. Since the joint sections 12 and 14 are the same, only joint section 12 will be described in detail.

Joint section 12 includes a rigid insert member generally indicated at 22, formed of a rigid metal or plastic material. The insert comprises a generally cylindrical sleeve or skirt portion 24 which extends axially of the joint, and an integral generally circular flange 26. The latter extends substantially perpendicularly to the radially inner cylindrical surface 24a of skirt 24 and substantially perpendicular to the axis of the joint. Skirt portion 24 also includes a radially outer surface 24b which tapers radially outwardly in approaching its junction with the axially inner flange face. Flange 26 includes an axially outer face 26a, an axially inner face 26b, and a peripheral edge 26c. The radially inner surface of the axially outer flange face 26a is recessed as indicated at 30 to provide an interlocking action with the fabric plies, as will be explained.

Joint 10 includes a carcass formed by a plurality of plies of rubber—or elastomer impregnated fabric 28 lying in the arch 16 and extending in opposite directions into the respective joint sections 12 and 14. The plies of fabric 28 are of varying lengths. Some of the plies extend beneath (with respect to the view of FIGURE 1) or radially inwardly of the radially inner surface 24a of skirt 24, and then bend radially outwardly to extend into the recessed surface 30 of flange face 26a. These plies are bonded to the rigid insert member 22. This aids in anchoring or locking the insert member in a fixed position in the joint section. Some of the plies of fabric extend beneath (with respect to the view of FIGURE 1) the radially innermost surface 24a of skirt 24 and then bend so as to extend along the axially outer face 26a of the flange 26 for the entire radial dimension of face 26a. Still other plies of the fabric 28 extend above (with respect to the view of FIGURE 1) or radially outwardly of the radially outer surface 24b of skirt 24 of the rigid insert. Some of the last-mentioned plies terminate adjacent the axially inner face 26b of flange 26 and do not extend radially along flange face 26b, while other plies of the group which lie radially outwardly of the tapered surface 24b of the skirt are bent so as to extend radially along the axially inner face 26b of the flange for all or part of the radial dimension of face 26b.

In order to aid in holding the rigid insert member 22 in assembled relation in the joint section and in proper structural association with the carcass formed of the fabric plies 28, a plurality of turns of wire 32 are wound helically about and in radially outwardly spaced relation to the radially outer surface 24b of skirt 24. Wires 32 lie intermediate the radial thickness of the plies of fabric 28.

The radially inner and radially outer surfaces of the entire expansion joint 10 are covered with a rubber or elastomeric covering or sheathing 34 applied to these surfaces by a molding process. The rubber or elastomeric cover 34 extends along the entire inner and outer peripheral surfaces of the two joint sections 12 and 14, including along the inner and outer surfaces of flexible annular arch 16, along the axially inner and outer surfaces of flexible annular arch 16, along the axially inner and outer surfaces 26a and 26b of flange 26, as well as along the outer peripheral edge surface 26c of the flange of the flange of each joint section. The portion of the rubber or elastomeric sealing sheath 34 which extends along the face 26a of each flange also serves as a gasket which seals the joint between flange surface 26a and the flanges 19 and 21 of the adjacent pipe sections 18 and 20.

Figure 2:
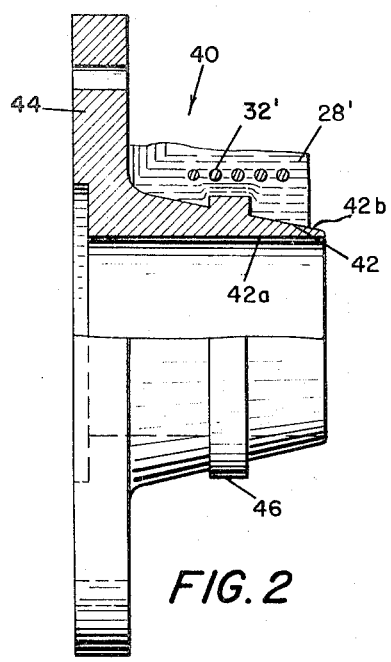
FIGURE 2 is a view in side elevation, and partially in section, of a modified type of rigid insert in accordance with the invention.

There is shown in FIGURE 2 a modified form of rigid insert 40 which may be made of metal or plastic, and which is generally similar to insert 22 of FIGURE 1, including a tubular skirt 42 having a flange 44 extending radially therefrom. The skirt 42 includes a cylindrical inner surface 42a and a radially outer surface 42b which tapers radially in approaching the junction with flange 44. A feature of the construction of the modified rigid insert 40 of FIGURE 2 is the provision of an annular projection 46 which extends radially outwardly from surface 42b intermediate the axial length of body portion 42. Ring-like projection 46 serves to anchor rigid insert 40 to the carcass by preventing axial movement of the insert relative to the carcass. Reinforcing wires 32' similar to the wires 32 of FIGURE 1 are wound helically about and in radially outwardly spaced relation to the radially outer surface 42b of skirt 42, wires 32' lying intermediate the radial thickness of the plies of fabric 28 and serving to hold the fabric carcass and rigid insert 40 in proper structural association with each other.

Figure 3:
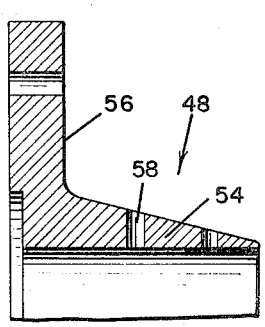
FIGURE 3 is a fragmentary vertical sectional view of another modified type of rigid insert.

There is shown in FIGURE 3 a still further modified form of rigid insert 48 generally similar to the insert 22 of FIGURE 1, and including a tubular skirt portion 54 and a radially extending flange 56. A feature of the construction of FIGURE 3 is the provision of a plurality of radially extending holes or passages 58 into which molten rubber or elastomeric material may flow during the molding process. In this construction a piece of material such as the outer rubber or elastomeric covering, such as that indicated at 34 of FIGURE 1, is applied to the skirt 54, to thereby form rubber detents which extend into holes 58 to secure the rigid insert 48 in place with respect to the rest of the joint body. Obviously rubber impregnated fabric and other known layered carcass construction will also form detents in the holes 58 when cured by vulcanization.

Figure 4:
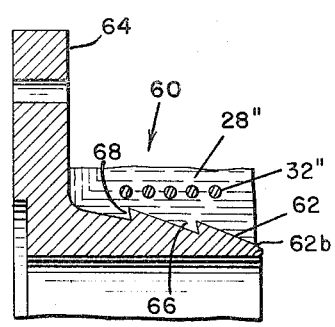
FIGURE 4 is a fragmentary vertical sectional view of still another modified type of rigid insert.

The modified form of rigid insert 60 shown in FIGURE 4 includes a tubular skirt 62 and a radially extending flange 64. The radially outer tapered surface 62b of skirt 62 is provided with groove 66 and 68 which are arranged in step-like formation due to the taper of the surface 62b. Grooves 66 and 68 provide an interlocking engagement between the rigid insert 60 and the carcass formed of fabric plies 28''. Reinforcing wires 32'' similar to the wires 32 of FIGURE 1 are wound helically about and in radially outwardly spaced relation to the radially outer surface 62b and to the grooves 66 and 68. Wires 32'' lie intermediate the radial thickness of the plies of fabric 28'' and serve to hold the fabric carcass and rigid insert 60 in proper structural association with each other.

It can be seen from the foregoing that there is provided in accordance with this invention an improved expansion joint construction and method of making such joints, which are improvements over the prior art. The use of the rigid cylindrical flanged insert in each joint section greatly strengthens the joint and eliminates the tendency of the joint to rupture along a line bisecting the 90° angle between the cylindrical body portion of the joint section and the flange of the joint section as has occurred in prior art expansion joints. Furthermore, the use of the rigid cylindrical flanged insert simplifies the construction of the joint and reduces the time and labor required for the manufacture of the joint. Also, the use of the rigid insert of the types described eliminates the necessity for back-up flanges and for annular reinforcing rings, both of which were often required in expansion joints of the prior art.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

I claim:

1. An expansion joint for connection in a fluid conducting line comprising a first and a second joint section, each of said joint sections including a generally hollow cylindrical composite body having a flange extending radially outwardly from the outer axial end thereof which is axially spaced from the central region of the joint, a generally annular flexible arch section connecting contiguous axial ends of said joint sections to each other at the central region of said joint, each joint section including a rigid insert member therein having an axially inwardly directed tubular skirt portion extending axially to the intersection of the respective joint section and the associated arch section, said insert having an integral rigid flange portion extending radially outwardly from said skirt portion of each insert at the flange end of the joint section, a multiple ply fabric carcass lying in said arch and extending into each joint section and along the surfaces of the rigid insert of each joint section, means on said skirt portion and wire means positioned radially outwardly of the skirt portion for anchoring said carcass on said skirt portion of the insert member, and an elastomeric sheathing substantially completely covering the outer surfaces of said joint.

2. An expansion joint as defined in claim 1 in which said rigid member is made of metal.

3. An expansion joint as defined in claim 1 in which said rigid insert member is made of plastic.

4. An expansion joint as defined in claim 1 in which the surface of the rigid flange portion of each rigid insert member is recessed on part of its surface area to receive at least some of the plies of the fabric carcass in interlocked relation.

5. An expansion joint as defined in claim 1 in which the means for anchoring said carcass on the skirt portion of said rigid insert member includes at least one radial passage extending from the inner to the outer surface of said skirt portion, said multiple ply fabric carcass extending into said radial passage to define a detent like interlock extending into said radial passage of said insert member.

6. An expansion joint as defined in claim 1 in which the means for anchoring said carcass on the radially outer surface of said skirt portion includes grooves which interlock with the fabric carcass.

References Cited by the Examiner

UNITED STATES PATENTS

| | | | |
|---|---|---|---|
| 1,808,084 | 6/1931 | Yackey | 285—149 X |
| 1,939,872 | 12/1933 | Bedur | 285—114 X |
| 2,219,047 | 10/1940 | Maclachlan | 285—149 |
| 2,273,398 | 2/1942 | Couty et al. | 285—259 X |
| 2,879,804 | 3/1959 | Hammond | 285—235 X |
| 2,911,236 | 11/1959 | Thibault | 138—138 X |
| 2,998,986 | 9/1961 | Buono | 285—229 |
| 3,051,512 | 8/1962 | Cranston | 285—235 X |
| 3,139,115 | 6/1964 | Bawcom et al. | 138—121 |

FOREIGN PATENTS 737,564   9/1955   Great Britain.

CARL W. TOMLIN, *Primary Examiner.*
THOMAS F. CALLAGHAN, *Examiner.*